(12) United States Patent
Dolan

(10) Patent No.: US 7,255,511 B2
(45) Date of Patent: Aug. 14, 2007

(54) RELEASABLE DOVETAIL CORNER JOINT

(76) Inventor: Kevin P. Dolan, 9754 Easton Rd., Kintnersville, PA (US) 18930

( * ) Notice: Subject to any disclaimer, the term of this patent is extended or adjusted under 35 U.S.C. 154(b) by 7 days.

(21) Appl. No.: 11/061,512

(22) Filed: Feb. 22, 2005

(65) Prior Publication Data

US 2006/0188325 A1 Aug. 24, 2006

(51) Int. Cl.
*A47B 13/00* (2006.01)
(52) U.S. Cl. .................. 403/403; 403/231; 403/373; 403/374.3; 403/381; 403/382; 312/140; 248/188; 248/188.1; 144/347; 144/354; 108/158.12; 108/153.1
(58) Field of Classification Search ............... 403/231, 403/381, 382, 373, 403, 374.1, 374.2, 374.3, 403/DIG. 10–13; 52/590.1, 584.1, 656.9; 312/111, 108, 265.2, 140; 108/158.12, 153.1; 248/188, 188.1; 144/344, 345, 347, 354
See application file for complete search history.

(56) References Cited

U.S. PATENT DOCUMENTS

| 206,234 | A | * | 7/1878 | Hall et al. | .................. 248/188 |
| 262,983 | A | * | 8/1882 | Robbins | ..................... 248/188 |
| 798,017 | A | * | 8/1905 | Davidson | ................. 52/204.57 |
| 805,993 | A | * | 11/1905 | Petz | ........................ 52/204.57 |
| 1,322,203 | A | | 11/1919 | Schroeder | |
| 1,605,597 | A | * | 11/1926 | Long | ........................... 52/464 |
| 2,115,531 | A | * | 4/1938 | Kron et al. | .................. 312/140 |
| 2,969,268 | A | * | 1/1961 | Mason et al. | ................ 312/7.2 |
| 3,024,686 | A | * | 3/1962 | Daugusta | ..................... 82/158 |
| 3,738,206 | A | * | 6/1973 | Parsons | ....................... 82/161 |
| 4,413,570 | A | * | 11/1983 | Haigh | ................... 108/158.13 |
| 4,925,319 | A | | 5/1990 | Reiss, Jr. | |
| 5,803,561 | A | | 9/1998 | Puehlhorn | |
| 6,176,641 | B1 | | 1/2001 | Schenk | |
| 6,250,032 | B1 | * | 6/2001 | Davis et al. | .................. 52/239 |
| 6,397,551 | B1 | | 6/2002 | Lewcock et al. | |
| 6,578,341 | B2 | | 6/2003 | Hoffmann et al. | |

* cited by examiner

*Primary Examiner*—Daniel P. Stodola
*Assistant Examiner*—Daniel J. Mills

(57) ABSTRACT

A corner leg assembly comprises two grooved mating elements divided longitudinally which when held together form the female groove portion of two dovetail joints, one on each side facing laterally 90 degrees apart. One of the corner elements is a substantially triangular corner leg having perpendicular outside surfaces and parallel lengthwise L-shaped grooves on a 45 degree inside surface. The second element is a clamp block which includes opposite-facing L-shaped side grooves corresponding (being the mirror image thereof) to the grooves on the corner leg. The clamp block is affixed down the middle of the corner leg along the inside surface by one or more clamping fasteners such as a screw or bolt which passes through the clamp block. By turning the fastener(s), the clamp block may be loosened or removed to vertically adjust a laterally-extending panel or rail member.

19 Claims, 1 Drawing Sheet

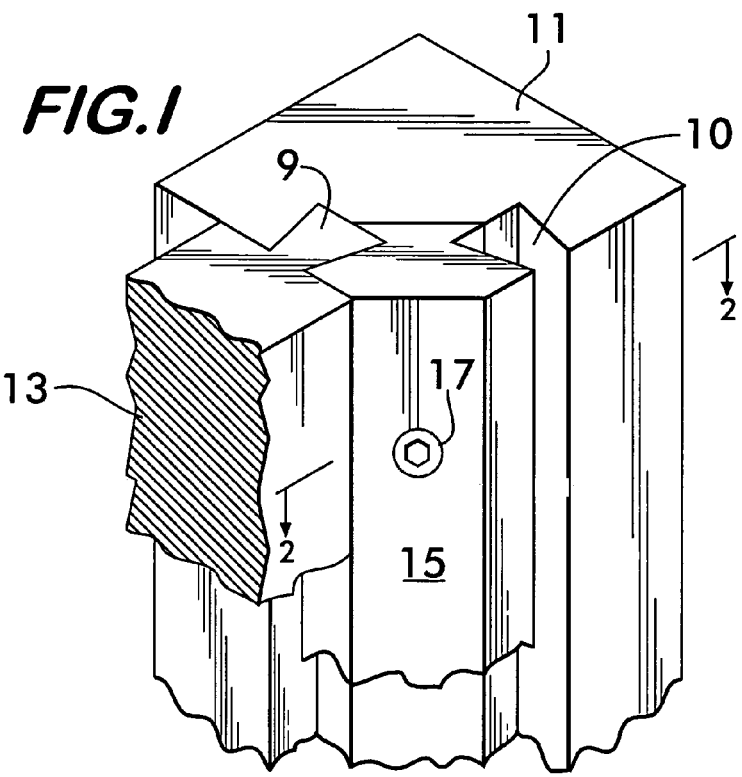
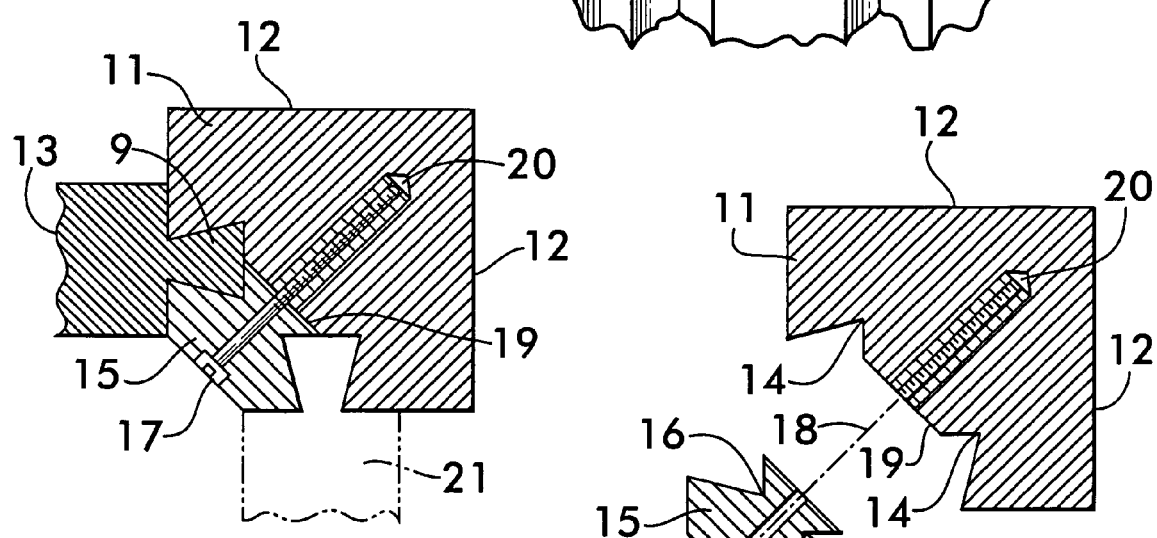

RELEASABLE DOVETAIL CORNER JOINT

FIELD OF THE INVENTION

The invention relates to joinery of wooden construction employed in the field of cabinetry and furniture-making. Specifically, it relates to a dovetail-type corner joint between a corner leg and a rail which includes a releasable clamping element so that the position of the rail along the corner leg may be adjusted or the rail element attached or detached laterally.

BACKGROUND OF THE INVENTION AND DESCRIPTION OF PRIOR ART

Various types of joints are well-known in the furniture and cabinet-making arts for connecting elements at right angles which can establish a corner portion of the cabinet or article of furniture. Butt joints, mortise and tenon joints, and dovetail joints are all well-known methods for creating such corner joinery. Typically these are all fixed position joints and when some adjustability of the parts is required, a tongue-and-groove type joint is often used. The problem with this type of joint is its lack of pull-out resistance which greatly diminishes its structural integrity. To solve this problem, slidable dovetail joints have been employed in which the male dovetail member can be moved and repositioned within an elongate female dovetail groove such as disclosed in the U.S. Pat. No. 5,803,561 issued to Puehlhorn. However, while this dovetail configuration provides lateral pull-out resistance, the slidable nature of the joint requires that the components be somewhat loosely fitting. This has obvious drawbacks to the structural integrity and strength of the joint.

One attempt to provide a better dovetail-type joint is shown in U.S. Pat. No. 6,397,551 issued to Lewcock et al. in which the female portion of the dovetail joint includes a locking element which enables a beam end to be secured to a second transversely extending beam. The problem with this system, however, is that the male element is not slidably adjustable and the locking elements are visible on the outside surface of the corner leg which is not aesthetically acceptable for fine furniture or cabinetry. Other attempts for providing a dovetail joint with a tightening function are disclosed in U.S. Pat. No. 4,042,307 issued to Jarvis and U.S. Pat. No. 4,249,355 issued to Anderson et al. These patents disclose the use of wedge-type inserts applied to a cavity in the male portion of the dovetail joint to spread its sides outwardly. While these structures have some utility, their use is limited for the following reasons: the tightening wedges can only be applied axially, they cannot be easily removed and reinstalled, and access to the wedges is restricted.

There is therefore a need in the art for a corner joint construction for use in cabinetry and furniture-making which provides a corner joint with a high degree of structural integrity yet permits positional adjustability of a rail or panel along the length of the corner leg while providing selective lateral attachment and release capability of the rail or panel.

SUMMARY OF THE INVENTION

In order to fulfill the need in the art described above, the present dovetail corner joint has been devised in which a laterally-extending panel or rail member may be vertically adjusted at different points along the length of a corner leg assembly. The corner leg assembly comprises two grooved mating elements divided longitudinally which when held together form the female groove portion of two dovetail joints, one on each side facing laterally 90 degrees apart. One of the corner elements is a substantially triangular corner leg having perpendicular outside surfaces and parallel lengthwise L-shaped grooves on a 45 degree inside surface. The second element is a clamp block which includes opposite-facing L-shaped side grooves corresponding (being the mirror image thereof) to the grooves on the corner leg. The clamp block is affixed down the middle of the corner leg along the inside surface by one or more clamping fasteners such as a screw or bolt which passes through the clamp block.

Once assembled, the two corner elements form perpendicularly-aligned, vertically-oriented dovetail grooves which can receive corresponding male dovetail members on the side edges of rails or panels to be joined. By turning the fastener(s), the clamp block may be loosened or removed. Loosening the clamp increases the joint space and permits the rail or panel to be repositioned along the length of the dovetail groove. When the fastener(s) are re-tightened, the rail or panel is fixed at the new position. If the fastener(s) are removed completely or grossly loosened, the rail or panel can be assembled or disassembled from the corner leg in the lateral direction. The present assembly therefore provides a corner joint assembly which facilitates the adjustment or the assembly of parts while providing the integrity and strength of dovetail joinery.

More specifically, a corner joint assembly has been devised which comprises a substantially triangular corner leg including two parallel, longitudinally-extending, L-shaped grooves on an inside surface, one on each side of a longitudinal axis which bisects an apex of the leg. Each corner leg groove includes major and minor sidewalls with an included angle of less than 90 degrees. Similarly, a clamp block includes two parallel, longitudinally-extending, L-shaped grooves which are opposite-facing, each comprising major and minor sidewalls having an included angle of less than 90 degrees which are identical in dimension to the sidewalls of the corner leg grooves. A releasable fastener which may be a screw or bolt joins the clamp block to the corner leg, the clamp block being in near abutment with an inner-facing surface of the corner leg and aligned so that the minor sidewalls of the clamp block grooves and the corner leg grooves are substantially coplanar and such that their adjacent respective major sidewalls form a dovetail groove between them. To permit the greatest degree of adjustability, the clamp block is elongate and substantially coextensive with the corner leg. The inner-facing surface of the corner leg is substantially planar and oriented at a 45 degree angle. The dovetail groove of the clamping assembly captures a male dovetail element on the rail or panel which extends laterally from the corner leg.

Other objects and advantages of the invention will become apparent to those of skill in the art from the following drawings and description of the preferred embodiment.

BRIEF DESCRIPTION OF THE DRAWINGS

FIG. 1 is a top front perspective view of the corner joint of the invention.

FIG. 2 is a top plan view taken from FIG. 1 as shown in that figure.

FIG. 3 is a top plan sectional assembly exploded view of the corner leg assembly.

DESCRIPTION OF THE PREFERRED EMBODIMENT

The invention comprises an assembly of parts for a corner joint for applications including but not limited to furniture and cabinetry. The elements of the assembly may be composed of wood or metal such as extruded aluminum. While the corner joint described in the preferred embodiment includes outside surfaces which are perpendicular, it should be understood that outside angles other than 90 degrees may be employed.

Referring now to FIG. 1, the invention provides a corner leg 11 with a clamping block 15 which is secured thereto by a fastener 17. As will be described further herein, grooves in the clamping block and in the corner leg are so configured and aligned such that two perpendicularly oriented female dovetail grooves such as groove 10 are formed between them. This enables a structure such as a rail or panel 13 having a male dovetail member 9 to be grasped and securely clamped between the clamping block 15 and the corner leg 11. Greater detail of this assembly of parts is shown in FIG. 2. The result is a corner joint construction with a high degree of structural integrity that also permits positional adjustability of the rail or panel 13 which can slide in the groove to a new position when the fastener 17 is loosened. Alternatively, all parts may be disassembled by removing the clamping block 15 entirely.

Referring now to FIG. 2, the corner leg includes two perpendicular outside surfaces 12 which forms the 90 degree outside corner of the completed article. Rails or panels 13 and 21 (shown in phantom) are parallel to these outside surfaces and are therefore also in a 90 degree alignment. At a 45 degree angle to these elements is a fastener 17 which passes through the clamping block 15 and into the corner leg 11 being threadably engaged to an insert member 20 which is secured within the corner leg. The clamping block 15 and an inside inner-facing surface 19 of the corner leg are in near abutment separated by a slight gap and thus it will be appreciated that surfaces of the clamping block provide a compression of the male dovetail elements, such as member 9 of rail 13, as fastener 17 is tightened. Further detail of the corner leg assembly is shown in FIG. 3.

Referring now to FIG. 3, elements of the corner leg assembly are joined by fastener element 17 which as previously described is threadably engaged with insert 20 that is secured within the corner leg 11. The fastener passes along an axis 18 which is at 45 degrees to the outside surfaces 12 of the corner leg and about which the various structures of the assembly are symmetrical in the horizontal plane. The dovetail grooves shown in FIGS. 1 and 2 are formed between the clamping block 15 and the corner leg 11 by the configuration and alignment of L-shaped grooves in each of the two parts. Corner leg 11 includes two parallel, longitudinally-extending, L-shaped grooves along an inside surface 19 thereof. The grooves have an included angle of less than 90 degrees and are symmetrical about a longitudinal planar axis 18 which bisects the corner angle, i.e. the apex, of the corner leg 11. Each of these grooves includes a shorter, minor sidewall and a longer, major sidewall. Similarly, the clamping block includes two parallel, longitudinally-extending, L-shaped grooves 16 which are opposite-facing and which include major and minor sidewalls that are identical in dimension to those of the corner leg and, in the assembled condition, are mirror images thereof As can be clearly seen with reference again to FIG. 2, female dovetail grooves are formed between the two components when they are clamped together by fastener 17. Although a single fastener is shown in these partial drawings, it may be understood that several fasteners may be included at different vertical points along the planar axis 18 as may be required to form a forceful clamping of the components along their length.

From the foregoing, it will be readily appreciated from those of skill in the art that the applicant has achieved a corner joint construction for use in cabinetry and furniture-making which provides a high degree of structural integrity that permits positional adjustability of the rail or panel along the length of the corner leg while providing selective lateral attachment and release capability of the rail or panel. It should be understood that there may be other modifications and changes to the present invention that will be obvious to those of skill in the art from the foregoing description, however, the present invention should be limited only by the following claims and their legal equivalents.

What is claimed is:

1. A corner joint assembly, comprising:
   a corner leg including two parallel, longitudinally-extending, L-shaped grooves along an inside surface thereof, one on each side of a plane which bisects an apex of the leg, each corner leg groove comprising major and minor planar sidewalls with an included angle of less than 90 degrees;
   a clamp block including two parallel, longitudinally-extending, L-shaped grooves which are opposite-facing by 180 degrees, each groove being a mirror image of an opposing one of the two corner leg grooves, each of the four said grooves being halves of two outward-facing dovetail recesses formed between the corner leg and the clamp block, a first half of each recess being in said corner leg and a second half of each recess being in said clamp block, said recesses disposed at an angle of 90 degrees; and
   a releasable fastener for joining said clamp block to said corner leg, said clamp block having a planar base perpendicular to the direction of clamping in near abutment with an inner-facing surface of said corner leg.

2. The corner joint assembly of claim 1 wherein said clamp block base is elongate and substantially coextensive with said corner leg.

3. The corner joint assembly of claim 2 wherein said corner leg includes two perpendicular outside surfaces.

4. The corner joint assembly of claim 3 wherein said inner-facing surface of said corner leg is substantially planar and is oriented at a 45 degree angle with respect to said perpendicular outside surfaces.

5. The corner joint assembly of claim 4 wherein said releasable fastener is a screw.

6. The corner joint assembly of claim 5 wherein said releasable fastener is a bolt.

7. The corner joint assembly of claim 1 further including a rail member extending laterally from said corner leg being joined thereto by a male dovetail element captured within one of said dovetail recesses.

8. The corner joint of claim 1 wherein said releasable fastener extends through the clamp block and into said corner leg.

9. The corner joint assembly of claim 1 wherein the respective sidewalls of the corner leg grooves and the clamp block grooves are substantially identical in dimension.

10. The corner joint assembly of claim 1 wherein said corner leg and said clamp block are composed of wood.

11. The corner joint assembly of claim 1 wherein said corner leg and said clamp block are composed of metal.

12. The corner joint assembly of claim 11 wherein said metal is extruded aluminum.

13. A corner joint assembly, comprising:
   a corner leg including only two parallel, longitudinally-extending, L-shaped grooves, each groove having major and minor planar sidewalls with an included angle of less than 90 degrees;
   a clamp block including two opposite-facing, longitudinally-extending, L-shaped grooves, each with major and minor planar sidewalls including an angle of less than 90 degrees;
   a releasable fastener joining said clamp block to said corner leg; and
   wherein two pairs of the L-shaped grooves one on the clamp block and one pair on the corner leg are in opposing parallel alignment such that two dovetail recesses are formed disposed at 90 degrees from each other for forcibly receiving a closely interfitting dovetail tongue of an attached rail in each recess, each recess consisting of two halves, the first half of each recess being in said corner leg and the second half of each recess being in said clamp block.

14. The corner joint assembly of claim 13 wherein said corner leg further includes an inner-facing surface in abutment with a planar base of said clamp block.

15. The corner joint assembly of claim 14 wherein said corner leg includes two perpendicular outside surfaces.

16. The corner joint assembly of claim 15 wherein said inner-facing surface of said corner leg is substantially planar and is oriented at a 45 degree angle with respect to said perpendicular outside surfaces.

17. The corner joint assembly of claim 13 wherein the respective sidewalls of the corner leg grooves and the clamp block grooves are substantially identical in dimension.

18. A corner joint assembly, comprising:
   a corner leg including only two parallel, longitudinally-extending, L-shaped grooves, each groove having major and minor planar sidewalls with an included angle of less than 90 degrees;
   a clamp block including only two longitudinally-extending L-shaped grooves opposite-facing by 180 degrees, each with major and minor planar sidewalls including an angle of less than 90 degrees;
   a releasable fastener joining said clamp block to said corner leg; and
   wherein two pairs of the L-shaped grooves one pair on the clamp block and one pair on the corner leg are in opposing parallel alignment thereby forming two dovetail recesses having outwardly convergent sidewalls are formed disposed at 90 degrees from each other for forcibly receiving a closely interfitting outwardly divergent dovetail tongue of an attached rail in each recess.

19. A corner joint assembly, comprising:
   a corner leg including two parallel, longitudinally-extending, L-shaped grooves along an inside surface thereof, one on each side of a plane which bisects an apex of the leg, each corner leg groove comprising major and minor planar sidewalls with an included angle of less than 90 degrees;
   a clamp block including two parallel, longitudinally-extending, L-shaped grooves which are opposite-facing by 180 degrees, each groove being a mirror image of an opposing one of the two corner leg grooves, each of the four such that two outward-facing dovetail recesses are formed between the corner leg and the clamp block, the dovetail recesses being which are disposed at an angle of 90 degrees;
   a releasable fastener for joining said clamp block to said corner leg, said clamp block having a planar base perpendicular to the direction of clamping in near abutment with an inner-facing surface of said corner leg; and
   wherein said corner leg includes two perpendicular outside surfaces and said inner-facing surface of said corner leg is substantially planar and is oriented at a 45 degree angle with respect to said perpendicular outside surfaces.

\* \* \* \* \*